US007620758B2

(12) United States Patent
Hsu

(10) Patent No.: US 7,620,758 B2
(45) Date of Patent: Nov. 17, 2009

(54) SYSTEM AND METHOD FOR FAST ACTIVATION AND PLAYING USING A MULTIMEDIA PLAYBACK CONTROL MODULE TO LOAD AND EXECUTE CORE PROGRAM

(75) Inventor: Sheng-Kai Hsu, Luodong Township, Yilan County (TW)

(73) Assignee: Getac Technology Corporation, Hsinchu (TW)

( * ) Notice: Subject to any disclaimer, the term of this patent is extended or adjusted under 35 U.S.C. 154(b) by 289 days.

(21) Appl. No.: 11/293,140

(22) Filed: Dec. 5, 2005

(65) Prior Publication Data

US 2007/0055802 A1 Mar. 8, 2007

(30) Foreign Application Priority Data

Aug. 19, 2005 (TW) ............... 94128459 A

(51) Int. Cl.
- *G06F 13/12* (2006.01)
- *G06F 13/38* (2006.01)
- *G06F 13/14* (2006.01)
- *G06F 13/36* (2006.01)

(52) U.S. Cl. ............ 710/72; 710/67; 710/305; 710/306; 326/37

(58) Field of Classification Search ............ 710/67
See application file for complete search history.

(56) References Cited

U.S. PATENT DOCUMENTS

| 2003/0079069 A1* | 4/2003 | Hung ............ 710/72 |
| 2003/0210232 A1* | 11/2003 | Chen ............ 345/168 |
| 2004/0104893 A1* | 6/2004 | Huang ............ 345/168 |
| 2004/0212585 A1* | 10/2004 | Wen et al. ............ 345/156 |
| 2004/0225790 A1* | 11/2004 | George et al. ............ 710/260 |
| 2005/0114717 A1* | 5/2005 | Chen ............ 713/300 |
| 2005/0193104 A1* | 9/2005 | Mason et al. ............ 709/223 |
| 2005/0204181 A1* | 9/2005 | Montero et al. ............ 714/4 |
| 2005/0270060 A1* | 12/2005 | Mulligan ............ 326/37 |

FOREIGN PATENT DOCUMENTS

| CN | 1503104 | 6/2004 |
| DE | 10331546 | 5/2004 |
| GB | 2232514 | 12/1990 |
| WO | WO2004/090898 | 3/2005 |

OTHER PUBLICATIONS

Communication from the German Patent Office.

* cited by examiner

*Primary Examiner*—Niketa I Patel
*Assistant Examiner*—Brooke J Dews
(74) *Attorney, Agent, or Firm*—Quintero Law Office, PC

(57) ABSTRACT

A dual-CPU computer-based multimedia system is provided, including a computer connected to a multimedia playing control module. The multimedia playing control module has a second CPU connected to the computer through a bus, a multimedia activation and playing system memory connected to the second CPU and storing a second operating system and a kernel program, and at least a hotkey, connected to the second CPU through a hotkey interface circuit, with each hotkey corresponding to a multimedia player. When the second PCU detects any hotkey being operated, the second PCU loads the kernel of the second operating system from the multimedia activation and playing system memory and executes the kernel. Then, the second CPU loads and executes the driver and the application program for the multimedia player corresponding to the operated hotkey.

7 Claims, 5 Drawing Sheets

SYSTEM AND METHOD FOR FAST ACTIVATION AND PLAYING USING A MULTIMEDIA PLAYBACK CONTROL MODULE TO LOAD AND EXECUTE CORE PROGRAM

FIELD OF THE INVENTION

The present invention relates to a method for activating computer-based multimedia systems and, more particularly, to a dual-CPU computer-based multimedia system and a method for fast activation of the dual-CPU computer-based multimedia system.

BACKGROUND OF THE INVENTION

A conventional method for activating a computer system is to install an operating system in the computer system. When the computer system is activated, basic system booting operation is performed, and once the booting process is completed, the computer system loads and executes the operating system and then loads and executes various drivers and application programs.

As the computers become more powerful, the computers get various applications in different fields and the computer manufacturers develop various designs to enhance computer usefulness to comply with the needs in different fields. For example, a recent popular design is a computer-based multimedia system integrating a multimedia player and a computer system.

However, the hardware design and the functionality objects of the computer system are different from those of multimedia players or household appliances. Therefore, when a computer-based system includes either a household appliance or a multimedia player with a computer system, the time required for activating the computer-based system is usually much longer than the press-and-play household appliance or multimedia player, such as CD or VCD players.

When a user uses a computer, it is seldom for the user to use all the functions provided by the computer. In general, many users use only one function, such as playing music, video, or watching TV. However, to activate such functions in a computer-based multimedia system, the user must reboot the computer first and wait for the computer to finish the basic input/output system (BIOS) activation, power-on self test (POST), detection and driving of peripherals, operating system activation, and so on, before the multimedia playing function can be executed.

To shorten the time required for activating a computer-based system, the conventional method is to include a second operating system in a separated region of the hard disk drive to provide the multimedia playing function.

Although the above method provides the user with the selection between a normal computer mode or a multimedia playing mode, the execution speed is still restricted by the speed to access the hard disk drive when the computer activates the operating system and accesses the data on the hard disk drive.

Furthermore, when the computer executes the multimedia playing functions, such as playing CD, VCD, digital music, or TV programs, the amount of multimedia data is large and it takes much of the CPU of the computer to access and process the multimedia data. Therefore, the speed for the computer to process other tasks is slow and the stability of the computer is affected.

SUMMARY OF THE INVENTION

Therefore, a primary object of the present invention is to provide a method for fast activation of a computer system for playing multimedia data so that the user can quickly activate the multimedia playing function when using a computer-based multimedia system.

Another object of the present invention is to provide a dual-CPU computer-based multimedia system, wherein one CPU controls the execution of the operating system for the computer, while the other CPU handles the execution of a multimedia operating system, to thereby overcome the problems encountered when a computer-based multimedia executing multimedia playing, such as CPU overloading, slow execution, and system instability.

To achieve the above objects, the present invention provides a computer to which a multimedia playing control module is connected. The multimedia playing control module comprises a second CPU, connected to the computer through a bus. A multimedia activation and playing system memory, connected to the second CPU, stores an operating system and the kernel of the operating system. At least a hotkey is connected to the second CPU through a hotkey interface circuit. Every hotkey corresponds to a pre-assigned multimedia player. When the second CPU detects the actuation of a hotkey, the second CPU loads the kernel of the second operating system from the multimedia activation and playing system memory and executes the kernel. Then, the second CPU loads and executes the driver and the application program for the multimedia player corresponding to the actuated hotkey. The driver and the application programs can be stored in the data storage media of the computer or the multimedia activation and playing system memory of the multimedia playing control module.

In comparison with the conventional computer-based multimedia systems, the present invention provides an arrangement involving two CPUs, one being for computer operating system execution and the other for the multimedia operating system execution, such as fast activation of multimedia playing and driving devices, and so on. Therefore, the speed of multimedia data access and playing can be faster than the access and playing on the conventional single-CPU computer-based multimedia system. Furthermore, by using two CPUs to separately process different operating tasks, the present invention prevents undesired interference between the normal computer tasks and the multimedia playing. Therefore, the execution speed is both fast and stable.

These and other objects, features and advantages of the invention will be apparent to those skilled in the art, from a reading of the following brief description of the drawings, the detailed description of the preferred embodiment, and the appended claims.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
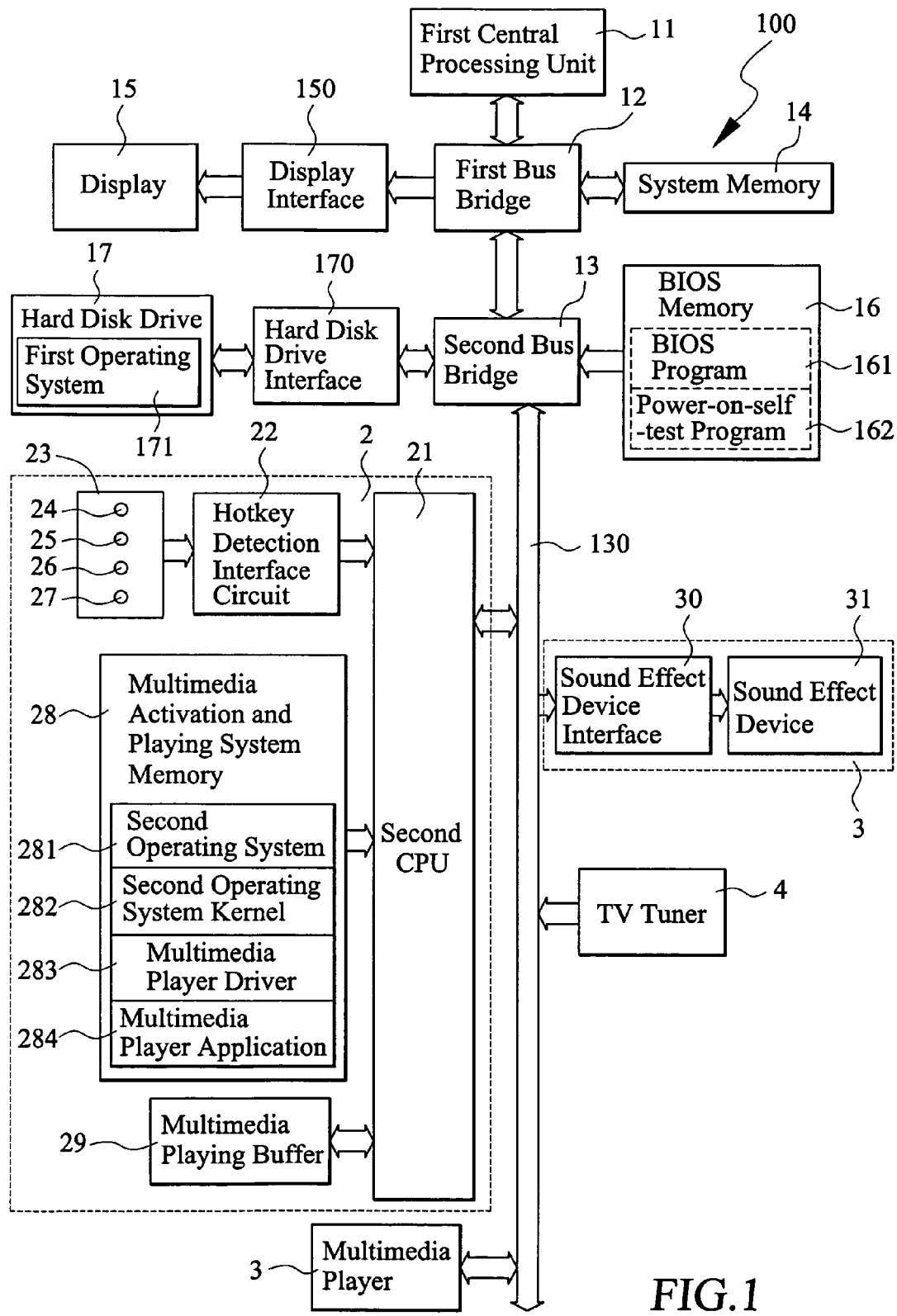
FIG. 1 shows a system functional block diagram of a dual-CPU computer-based multimedia system in accordance with the first embodiment of the present invention.

With reference to the drawings and in particular to FIG. 1, which shows a functional block diagram of a dual-CPU computer-based multimedia system in accordance with a first embodiment in accordance with the present invention, the system comprises a computer, which is generally designated with reference numeral 100, comprising a first central processing unit (CPU) 11, a first bus bridge 12, and a second bus bridge 13. The first CPU 11 is connected to the first bus bridge 12 through a system bus. The first bus bridge 12 is connected to a system memory 14, and is connected to a display 15 through a display interface 150.

The second bus bridge 13 is connected to a BIOS memory 16. The BIOS memory 16 stores a BIOS program 161 and a power-on-self-test (POST) program 162, which are required by the computer 100 during the booting.

The second bus bridge 13 is connected to a hard disk drive interface 170 through a bus. The hard disk drive interface 170 is connected to a hard disk drive 17. In the embodiment illustrated, the hard disk drive 17 serves to store data. The hard disk drive 17 is installed with a first operating system 171 and various multimedia player drivers and multimedia applications working under the first operating system 171. An example of the first operating system 171 includes a Windows (a registered mark of Microsoft corporation) operating system.

The second bus bridge 13 of the computer 100 is connected to a multimedia playing control module 2 through a bus 130. The bus 130 comprises a data bus, an address bus, and a control bus. The multimedia playing control module 2 comprises a second CPU 21. The second CPU 21 is connected to a hotkey set 23 through a hotkey detection interface circuit 22. The hotkey set 23 includes a plurality of hotkeys 24, 25, 26, 27, which can be operated by a user and identified by the second CPU 21 for activating the corresponding multimedia players, such as CD player, digital music device, VCD player or TV signal receiver. The hotkeys 24-27 can be defined as a control key for fast activation of pre-set multimedia players.

The second CPU 21 is connected to a multimedia activation and playing system memory 28. The multimedia activation and playing system memory 28 can be a disk on chip, flash ROM, or other data storage devices. The multimedia activation and playing system memory 28 stores a second operating system 281 and kernel 282 of the second operating system 281. The second operating system 281 is for example a Linux-based operating system or other types of operating systems, such as tiny window-based operating system, embedded operating system, and so on.

The multimedia activation and playing system memory 28 also stores at least a driver 283 and an application program 284 for a multimedia player. For example, the multimedia player driver 283 can be a driver for a CD player, a digital music device, a VCD player, or a TV signal receiver. The multimedia player application 284 can be an application program for a CD player, a digital music device, a VCD player, or a TV signal receiver.

The second CPU 21 is connected to a multimedia playing buffer 29 for temporary data and program storage when second CPU 21 is in operation.

Figure 2:
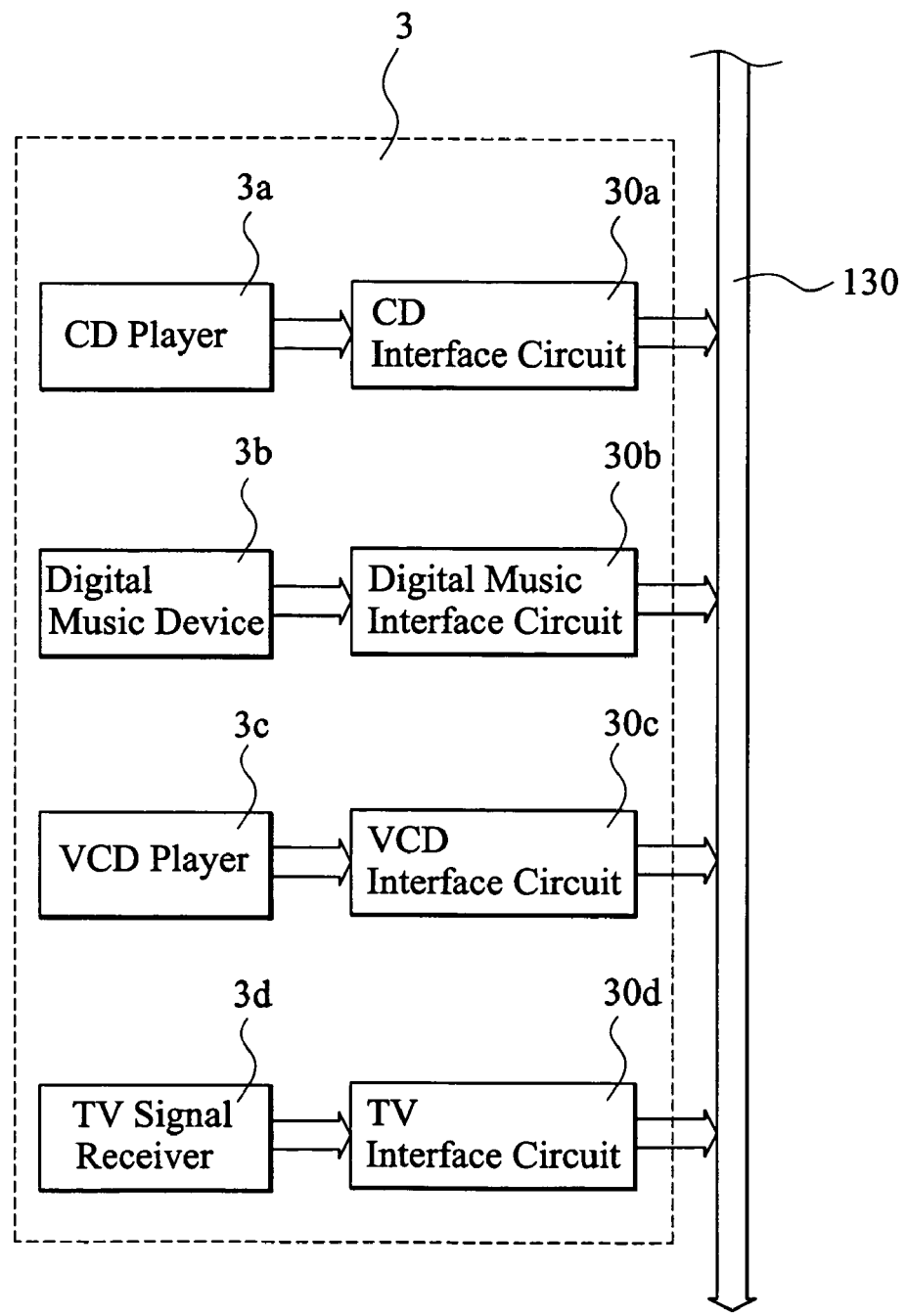
FIG. 2 shows a schematic view of the multimedia player of FIG. 1.

The bus 130 is connected to at least a multimedia player 3 for accessing multimedia data. As shown in FIG. 2, the multimedia player 3 include a CD player 3a, a digital music device 3b, a VCD player 3c, or a TV signal receiver 3d, which are connected to the bus 130 through a CD interface circuit 30a, a digital music interface circuit 30b, a VCD interface circuit 30c, and a TV interface circuit 30d, respectively.

In actual application, the multimedia player 3 can include one of the CD player 3a, digital music device 3b, VCD player 3c, TV signal receiver 3d, or any of the combination thereof.

The bus 130 is connected to a multimedia sound play device 4 comprising a sound effect device 41 that is connected through a sound effect device interface 40 to the bus 130 of the computer 100. A TV tuner 5 is also connected to the computer 100 through the bus 130. The sound effect device 41 and the TV tuner 5 are both multimedia sound play device 4 employed in the present invention. In displaying video image of the present invention, a display 15 of the computer 100 is served as displaying the multimedia video.

For actual applications of the present invention, the multimedia playing control module 2 can be built in the motherboard of the computer 100, or as an interface card plugged into the bus slot of the computer 100. Alternatively, the multimedia playing control module 2 can be arranged in a peripheral device of the computer 100.

Figure 3:
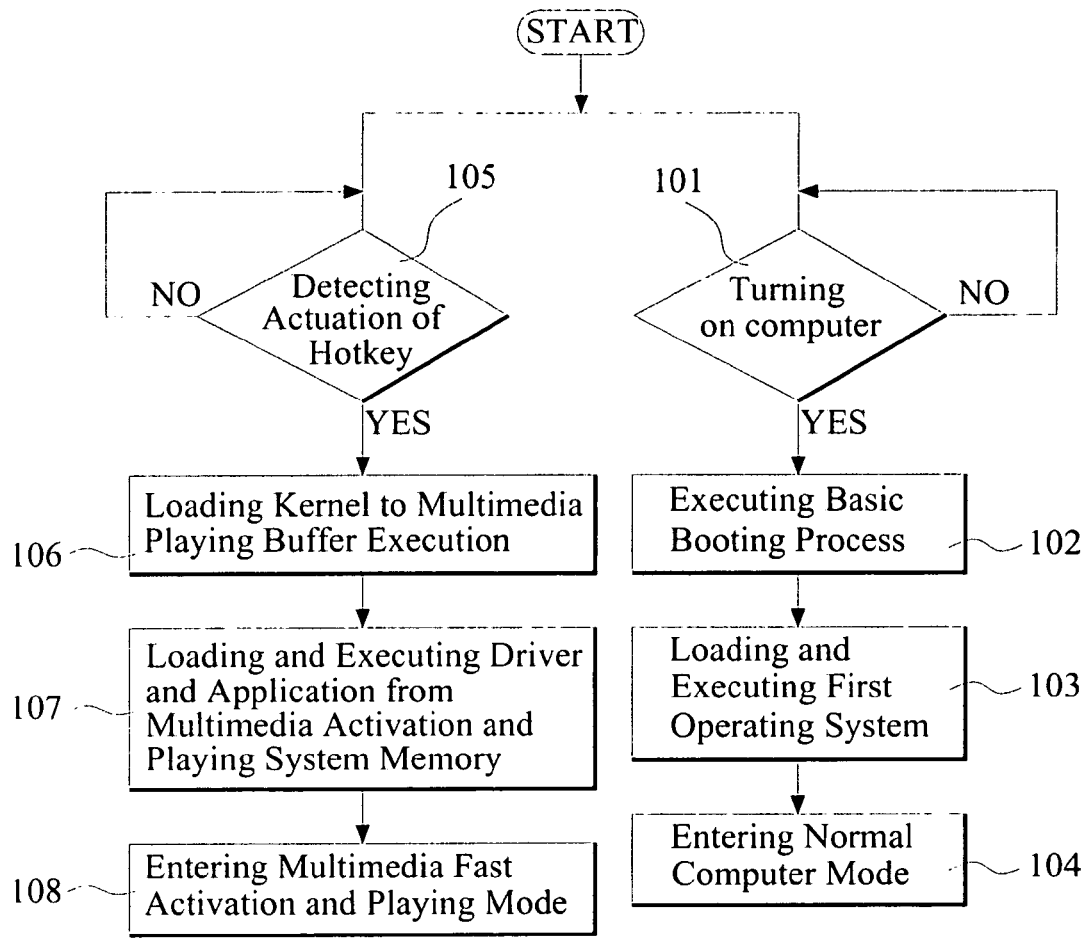
FIG. 3 shows an operational flowchart of the dual-CPU computer-based multimedia system of the first embodiment shown in FIG. 1.

FIG. 2 shows an operational flowchart of the first embodiment shown in FIG. 1. The following description refers to both FIGS. 1 and 3.

In step 101, the computer 100 is turned on, and then the computer 100 executes the basic booting process (step 102). That is, the computer 100 loads and executes the BIOS program 161, and the POST program 162 from the BIOS memory 16. After the computer 100 finishes the basic booting process, the computer 100 loads and executes the first operating system 171 (step 103) from the hard disk drive 17, and enters the normal computer mode (step 104). At this point, the user can operate the computer 100 as a normal computer device.

When the user intends to perform multimedia playing function, the user only needs to press one of the hotkeys 24, 25, 26, 27 of the hotkey set 23 to activate the corresponding multimedia device, such as CD player, digital music device, VCD player or TV signal receiver. That is, the second CPU 21 detects the actuation of the hotkey 24, 25, 26, 27 of the hotkey set 23 (step 105), and the second CPU 21 loads the second operating system kernel 282 in the multimedia activation and playing system memory 28 to the multimedia playing buffer 29 for execution (step 106). The kernel 282 can be stored as a compressed file in the multimedia activation and playing system memory 28 to save storage space, and can be uncompressed before loaded into the multimedia playing buffer 29.

Then, the second CPU 21 loads and executes the driver 283 and the application 284 of the multimedia player 3 corresponding to the actuated hotkey 24, 25, 26, 27 from the multimedia activation and playing system memory 28 (step 107). At this point, the computer 100 enters the multimedia fast activation and playing mode (step 108).

In the multimedia fast activation and playing mode, the music data accessed by the CD player 3a and the digital music device 3b go through the sound effect interface circuit 40 and played by the sound effect device 41 of the multimedia sound play device 4. The music data accessed by the VCD player and the TV signal receiver also go through the sound effect interface circuit 40 and played by the sound effect device 41 of the multimedia sound play device 4, while the video data go through the display interface 150 and displayed by the display 15 of the computer 100.

Figure 4:
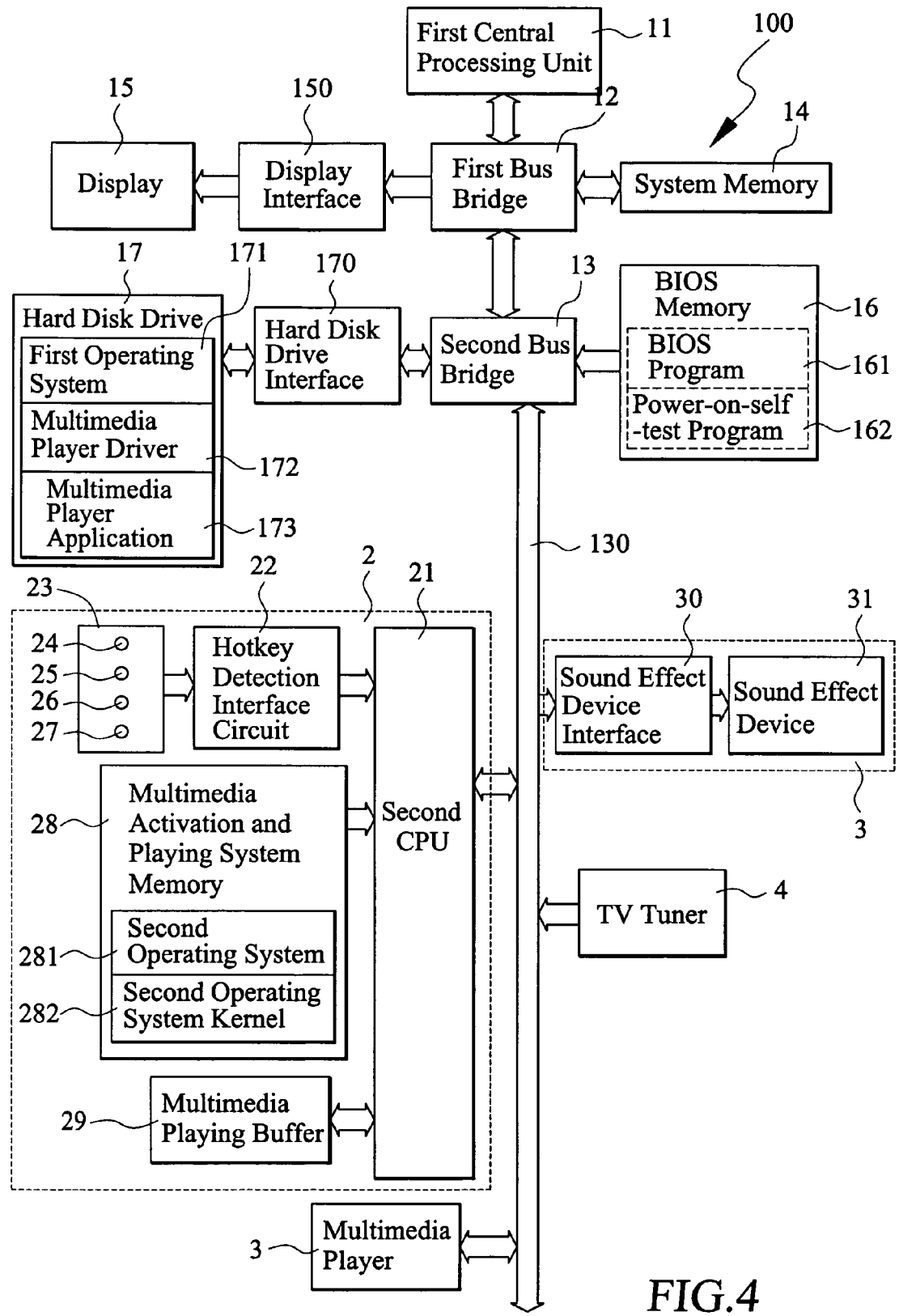
FIG. 4 shows a system functional block diagram of a dual-CPU computer-based multimedia system constructed in accordance with a second embodiment of the present invention.

FIG. 4 shows a system functional block diagram of a dual-CPU computer-based multimedia system in accordance with a second embodiment of the present invention, which is similar to that of the first embodiment, except that the hard disk drive 17 stores, in addition to the first operating system 171, at least a driver 172 and an application 173 for a multimedia playing device. For example, the multimedia player driver 172 can be a driver for a CD player, a digital music device, a VCD player, or a TV signal receiver. The multimedia player application 173 can be an application program for a CD player, a digital music device, a VCD player, or a TV signal receiver. On the other hand, the multimedia activation and playing system memory 28 of the multimedia playing control module 2 stores only the second operating system 281 and the kernel 282 of the second operating system 281, and does not store any drivers or applications for multimedia players.

Figure 5:
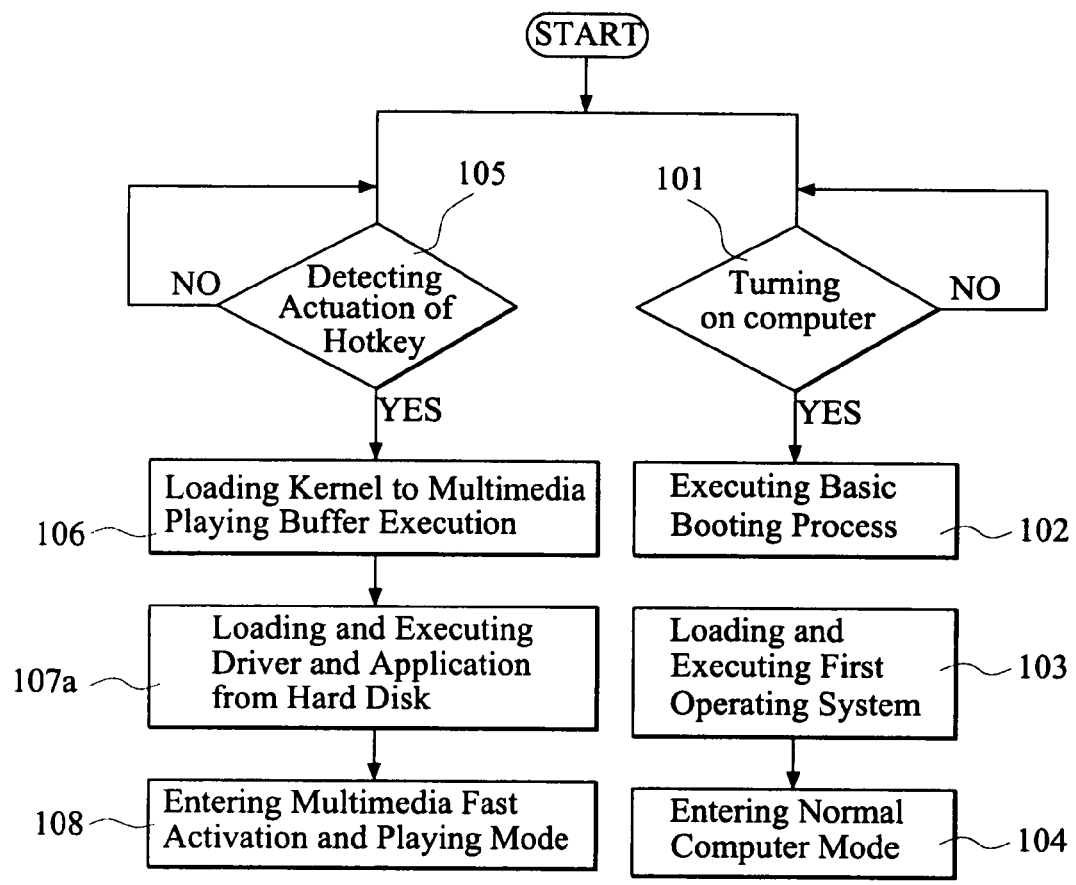
FIG. 5 shows an operational flowchart of the dual-CPU computer-based multimedia system of the second embodiment shown in FIG. 4.

FIG. 5 shows an operational flowchart of the second embodiment shown in FIG. 4. The flowchart is similar to the flowchart shown in FIG. 3, except that the driver and the application for the multimedia player are loaded from the hard disk drive 17 of the computer 100. That is, when the second CPU 21 detects the actuation of one hotkey 24, 25, 26, 27 of the hotkey set 23 (step 105), the second CPU 21 loads the second operating system kernel 282 in the multimedia activation and playing system memory 28 to the multimedia playing buffer 29 for execution (step 106).

Then, the second CPU 21 loads and executes the driver 172 and the application 173 of the multimedia player 3 corresponding to the actuated hotkey 24, 25, 26, 27 from the hard disk drive 17 of the computer 100 (step 107a). At this point, the computer 100 enters the multimedia fast activation and playing mode (step 108).

While the invention has been described in connection with what is presently considered to the most practical and preferred embodiments, it is to be understood that the invention is not to be limited to the disclosed embodiment, but on the contrary, is intended to cover various modifications and equivalent arrangement included within the spirit and scope of the appended claims.

What is claimed is:

1. A dual-CPU computer-based multimedia system, comprising:
   a computer, comprising a first CPU, a data storage media connected to the first CPU, a system memory, a BIOS, and a bus, the data storage storing a first operating system;
   at least a multimedia player, connected to the computer through the bus for accessing and playing multimedia data; and
   a multimedia playing control module, comprising:
      a second CPU, connected to the computer through the bus,
      a multimedia activation and playing system memory, connected to the second CPU and storing a second operating system and a kernel program,
      a multimedia playing buffer, connected to the second CPU, and
      at least a hotkey, connected to the second CPU through a hotkey interface circuit, each hotkey corresponding to a pre-assigned multimedia player;
   wherein the system is configured such that when the second CPU detects actuation of one hotkey, the second CPU loads and executes the kernel program of the second operation system from the multimedia activation and playing system memory into the multimedia playing buffer without operation of the first CPU and the first operating system, and further loads and executes a driver and an application of the multimedia player corresponding to the actuated hotkey without operation of the first CPU and the first operating system.

2. The system as claimed in claim 1, wherein the multimedia player comprises a device selected from a group consisting of a CD player, a digital music device, a VCD player, a TV signal receiver and a combination thereof.

3. The system as claimed in claim 1, wherein the driver and the application of the multimedia player corresponding to the hotkey are stored in the multimedia activation and playing system memory of the multimedia playing control module.

4. The system as claimed in claim 1, wherein the driver and the application of the multimedia player corresponding to the hotkey are stored in the data storage media of the computer.

5. A method for fast activation of a multimedia playing function for a computer-based computer multimedia system, applicable to a computer system having a first CPU, a data storage media connected to the first CPU, a system memory, a BIOS, and a bus, the data storage media storing a first operating system, the computer connected to a multimedia playing control module, the multimedia playing control module comprising a second CPU, a multimedia activation and playing system memory storing a second operating system and a kernel program, a multimedia playing buffer, and at least a hotkey, connected to the second CPU through a hotkey interface circuit, each hotkey corresponding to a pre-assigned multimedia player; the method comprising the following steps:
   (a) detecting an operating state of each hotkey;
   (b) upon detecting actuation of one of the hotkeys, the second CPU loading and executing the kernel program of the second operating system into the multimedia playing buffer;
   (c) loading and executing a driver and an application of the multimedia player corresponding to the hotkey without operation of the first CPU and the first operating system; and
   (d) activating the multimedia player corresponding to the actuated hotkey for multimedia playing function without operation of the first CPU and the first operating system.

6. The method as claimed in claim 5, wherein in step (c), the driver and the application of the multimedia player corresponding to the hotkey are loaded from the data storage media of the computer.

7. The method as claimed in claim 5, wherein in step (c), the driver and the application of the multimedia player corresponding to the hotkey are loaded from the multimedia activation and playing system memory of the multimedia playing control module.

* * * * *